United States Patent [19]

Augsburger

[11] Patent Number: 4,652,188
[45] Date of Patent: Mar. 24, 1987

[54] CENTERING TOOL

[76] Inventor: Harold A. Augsburger, 1717 Eucalyptus Dr., San Francisco, Calif. 94132

[21] Appl. No.: 765,730

[22] Filed: Aug. 15, 1985

[51] Int. Cl.$^4$ ............................................. B23Q 17/00
[52] U.S. Cl. .................................. 409/131; 33/181 R; 33/191; 408/1 R; 408/75; 409/218
[58] Field of Search .................... 408/72 R, 72 B, 75, 408/97, 115 R, 115 B, 104, 105, 107, 1 R; 33/182, 191, 181 R; 409/131, 218

[56] References Cited

U.S. PATENT DOCUMENTS

| 2,418,956 | 4/1947 | Silver | 33/191 X |
| 2,427,290 | 9/1947 | Licwinko | 33/191 X |
| 3,661,469 | 5/1972 | Lett et al. | 408/72 R |
| 3,907,452 | 9/1975 | Tripp | 408/72 B X |

FOREIGN PATENT DOCUMENTS 1068475  11/1959  Fed. Rep. of Germany .... 33/181 R

Primary Examiner—Z. R. Bilinsky
Attorney, Agent, or Firm—Thomas M. Freiburger

[57] ABSTRACT

A centering tool for use in a chuck or collet of a drill press or milling machine enables positioning of a round or cylindrical workpiece such that its axis is precisely positioned to intersect the axis of rotation of the machine. The tool enables the efficient drilling of a hole through a cylindrical bar, perpendicular to the axis of the bar, for example. A cylindrical shank of the tool is adapted for insertion into the chuck or collet, and a centering body affixed to the shank has a generally V-shaped centering notch symmetrical about the shank's axis and having an apex line crossing the shank's axis. Using this tool, a workpiece may be centered with respect to a machine spindle by inserting and tightening the shank of the tool in the collet or chuck on the spindle, placing the workpiece on a surface adjacent to the centering tool, moving the centering tool and the chuck axially into engagement with the workpiece until the centering notch precisely centers the workpiece with the axis of the centering tool's shank and of the spindle, then clamping the workpiece onto the table while inserting the appropriate cutting tool into the chuck and performing the desired operation.

4 Claims, 4 Drawing Figures

CENTERING TOOL

BACKGROUND OF THE INVENTION

The invention relates to machine tools generally, and more particularly to a centering tool for use with drill presses, milling machines and other machining apparatus, to enable efficient and precise centering of a round workpiece with respect to the axis of rotation of a machine's spindle.

V-blocks in a number of different configurations have been used as components or steps in procedures for centering cylindrical workpieces. For example, see U.S. Pat. Nos. 1,093,029, 2,061,718, 2,416,782, 2,556,131, 2,455,024, 3,188,076, 3,345,061, and 3,985,462. All of these previous patents show V-blocks in different forms, usually in connection with machining apparatus. Some of them, such as U.S. Pat. Nos. 1,093,029, 3,188,076 and others show forms of V-block used to help position a cylindrical workpiece along the axis of a spindle of a machine which is to perform an operation requiring centering on the workpiece. However, these involve relatively elaborate equipment and procedure for accomplishing a simple goal. The earlier of these two patents shows a form of double V-block for engaging a cylindrical workpiece between upper and lower relatively moveable V-notches, the upper having a jig bore hole for receiving a specific size of drill bit from a drill press. The centering apparatus and the drill press had to be precisely in registry, or adjusted to be in precise registry, and different-sized jig bore holes would have to be provided depending on the size of the drill bit to be used.

Prior centering devices of this nature have not been as efficient and versatile in use, and as simple in construction as the present invention described below.

SUMMARY OF THE INVENTION

The present invention is a one-piece, preferably integrally-formed centering tool having a shank for insertion in a chuck, collet or other tool-holding device, and a V-block on the end of the shank. The V-block is a centering body affixed to and preferably integral with the shank and with the V-shaped centering notch at the opposite end of the tool from the shank and symmetrical about the shank's axis, with an apex line of the notch crossing the shank's axis.

With this device a workpiece may be centered with respect to the spindle of a milling machine or other such apparatus by inserting and tightening the shank of the centering tool in the chuck or collet on the spindle, then placing the workpiece on a surface adjacent to the centering tool, such as a fixed work table. The centering tool in the chuck is then moved axially into engagement with the workpiece until the centering notch centers the workpiece with the axes of the tool shank and of the machine spindle.

The operator may then clamp the workpiece to the table or work surface while the workpiece is still engaged by the V-notch of the centering tool, assuring that the workpiece will remain centered for a milling or drilling operation.

The operator then removes the centering tool from the chuck or collet and inserts the desired drill bit or machine tool to perform the operation on the workpiece.

The V-notch of the centering tool of the invention may have a notch angle which will accommodate hexagonal workpieces as well as round workpieces, or octagonal workpieces or square workpieces, or more preferably, a simple 90° angle in the notch can be used for all workpieces, since simple line contact at two locations is all that is required.

The centering tool may include a second centering notch, perpendicular to the first and intersecting it, but much shallower for use with workpieces of smaller diameter.

It is therefore among the objects of the invention to provide a relatively simple centering device for use with milling and drilling machinery and other machinery involving the need for centering a workpiece, whereby an operator can quickly, efficiently and accurately center a round, cylindrical, hexagonal or other symmetrically-shaped elongated workpiece prior to performing a machining operation which calls for accurate centering. This and other objects, advantages, features and characteristics of the invention will be apparent from the following description of preferred embodiments, considered along with the accompanying drawings.

DESCRIPTION OF PREFERRED EMBODIMENTS

Figure 1:
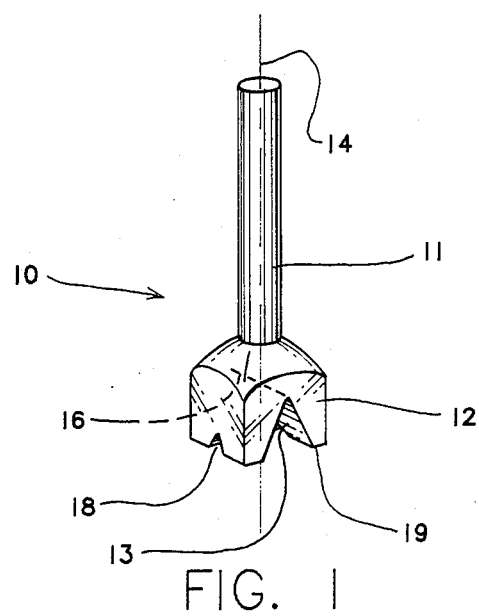
FIG. 1 is a perspective view showing a centering tool in accordance with the principles of the invention.

In the drawings, FIG. 1 shows a centering tool 10 in accordance with the invention, including a shank 11 for insertion into a chuck, collet or other holding device of a milling machine, drill press or other such machining apparatus, and a centering body 12 which includes a centering V-notch 13.

The shank of the tool 10 has a center axis 14 which is precisely aligned with and intersecting an apex line 16 of the V-notch. The V-notch is symmetrical about the axis 14 of the shank, such that the axis 14 is a bisector of the angle defined by the V-notch. This assures that a workpiece engaged by the V-notch, e.g., a cylindrical workpiece, will be centered on the axis 14 of the shank.

As also seen in FIG. 1, there preferably is included a second V-notch 18, which may be generally at right angles to the first notch but much shallower, i.e., extending inward to a considerably lesser degree from the bottom end 19 of the tool than does the first V-notch 13. The shallower notch 18 bridges across the deeper notch and is defined by two sides which are on either side of the deep notch 13. Workpieces of smaller diameter can be engaged by the shallower V-notch 18, when the larger notch 13 would be too wide to engage the small workpiece against a flat surface.

Figure 2:
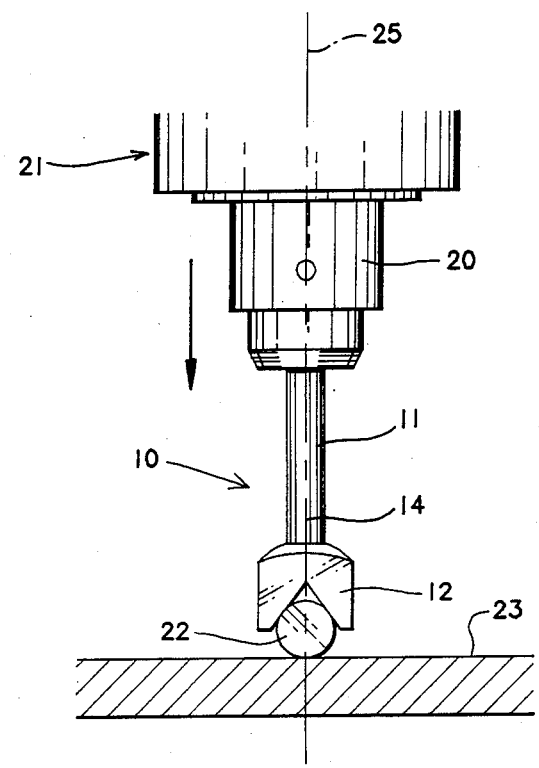
FIG. 2 is a view showing the centering tool being used in a machine such as a drill press, for centering a workpiece with respect to the axis of rotation of the machine's spindle.
Figure 4:
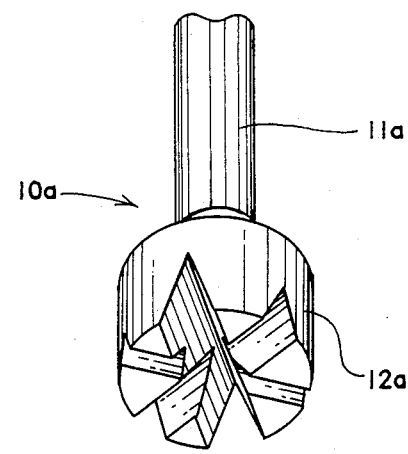
FIG. 4 is a bottom perspective view showing another embodiment of the tool of the invention.

It should be understood that additional V-notches can be provided in the bottom of the tool 10, e.g., four or five or even more, all having apices centered on the axis of the tool's shank 11a. See FIG. 4 showing three intersecting V-notches in a modified tool 10a. The centering body 12a of the tool 10 preferably is circular if more than two such V-notches are provided, as illustrated in FIG. 4. In FIG. 2 the centering tool 10 is engaged in a chuck or collet 20 of a drill press 21, milling machine, or other machining apparatus. The tool is illustrated with a drill press in these drawings.

FIG. 2 shows that the centering tool 10, tightened in the chuck 20, has been lowered along with the chuck to engage a workpiece 22, shown as a cylindrical bar, against a table 23 or other flat work surface which is stable in position with respect to the drill press or other machine. The V-notch has engaged the bar 22 and has forced it laterally into position until fully engaged within the V-notch, at which point the bar 22 lies centered with respect to the axis 14 of the tool's shank 11 and also with respect to an axis of rotation 25 of the rotatable spindle of the drill press or other machine.

Figure 3:
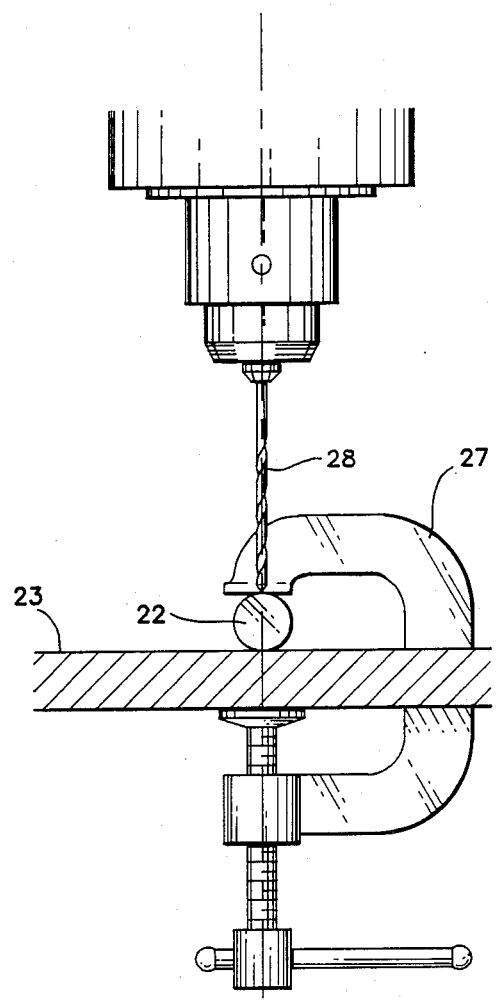
FIG. 3 is a view similar to FIG. 2, but showing the workpiece clamped in centered position on the table, with the drill press press having a drill bit prepared to drill a centered hole in the workpiece.

In FIG. 3 it is shown that the workpiece 22 has been clamped in the centered position against the table or other work surface 23, using any available form of clamps such as a C clamp 27 illustrated. The centering tool has been removed from the drill press chuck, and a machining tool or drill bit 28 has been inserted. The drill bit 28 will be centered with respect to the workpiece 22, and a bore may be made on center in the workpiece 22.

It should be understood that the centering tool of the invention may include one or more V-notches having any appropriate notch angle. The centering body 12 of the tool may include several V-notches, even three or more intersecting notches as shown in FIG. 4, for engaging workpieces of different diameters and different shapes, including hexagonal, octagonal, and other multi-sided workpieces. A common notch angle of 90° may be used for all notches to engage all shapes, since two lines of contact are sufficient for engagement of a workpiece. FIG. 4 is intended to illustrate multiple notches (e.g., three or more) of different sizes, to accommodate different diameter cylindrical workpieces and different dimensions of polygonal workpieces.

Although the centering tool of the invention is illustrated in conjunction with a drill chuck, it can be used with any form of spindle-connected tool holding device, including spindles designed for directly receiving a slightly tapered shank (e.g., a "Morse taper"). The shank of the centering tool may be slightly tapered for this type holding device, and the term cylindrical, as applied in this context, is intended to include such a slight taper.

The above described preferred embodiments are intented to illustrate the principles of the present invention, but not to limit the scope of the invention. Additional embodiments and variations to these preferred embodiments will be apparent to those skilled in the art and may be made without departing from the scope of the invention as defined in the following claims.

I claim:

1. A method for centering a workpiece with respect to the axis of rotation of a rotatable spindle of a milling machine, drill press or other machine for performing an operation on the workpiece, the machine having a tool holding device on its spindle, comprising:
    inserting into the tool holding device of the machine a centering tool having a shank and a centering body affixed to the shank with a generally V-shaped centering notch centered with the shank and symmetrical about the shank's axis;
    tightening the tool holding device onto the shank;
    positioning the workpiece on a surface such that it is generally near the axis of the rotatable spindle;
    with the spindle non-rotating, moving the tool holding device axially toward the workpiece and into engagement with the workpiece until the centering notch centers the workpiece precisely with the axes of the centering tool's shank and the spindle.

2. A method according to claim 1, further including, following cnetering of the workpiece with the centering notch, retaining the workpiece in centered position against said surface using a retaining means, retracting the tool holding device axially away from the workpiece, removing the centering tool from the tool holding device, and inserting into the tool holding device a tool for performing a desired operation, requiring centering, on the workpiece.

3. A centering tool for positioning a workpiece having a central axis such that its central axis intersects and is generally perpendicular to the axis of rotation of a rotatable spindle of a machine for performing an operation on the workpiece requiring centering, comprising:
    a shank having a shank axis and adapted for insertion into a tool holding device connected to the rotatable spindle; and
    a centering body affixed to the shank, having an end opposite the shank including an open, generally V-shaped notch symmetrical about the shank axis and having a notch apex line crossing the shank axis generally normally thereto;
    a second, shallower V-shaped centering notch, in an intersecting relationship with said V-shaped centering notch, the second notch also symmetrical about the shank axis and with an apex line crossing the shank axis generally normally thereto, whereby smaller workpieces can be engaged by the second V-shaped notch for centering;
    whereby a workpiece may be centered with respect to the spindle by inserting and tightening the shank of the centering tool in the tool holding device on the spindle, placing the workpiece on a surface adjacent to the centering tool, and moving the centering tool and the tool holding device axially into engagement with the workpiece until one of the centering notches centers the workpiece with the axes of the centering tool's shank and the spindle.

4. The centering tool of claim 3, including at least three said V-shaped centering notches in the centering body, all having apex lines crossing the shank axis and each being of different configuration for different sizes and shapes of workpieces, and wherein the different configurations include different depths of notches for engaging workpieces of different sizes.

* * * * *